United States Patent
Sardat et al.

(10) Patent No.: US 9,515,481 B2
(45) Date of Patent: Dec. 6, 2016

(54) PRINTED CIRCUIT BOARD FOR COMPRESSOR HOUSING

(75) Inventors: Pierre Sardat, Le Raincy (FR); Bruno Hadjelis, Saint Ouen L'aumone (FR); Hubert Lescot, Eragny (FR)

(73) Assignee: VALEO JAPAN Co, Ltd, Saitama (JP)

( * ) Notice: Subject to any disclaimer, the term of this patent is extended or adjusted under 35 U.S.C. 154(b) by 931 days.

(21) Appl. No.: 13/531,989

(22) Filed: Jun. 25, 2012

(65) Prior Publication Data

US 2013/0021826 A1    Jan. 24, 2013

(30) Foreign Application Priority Data

Jun. 24, 2011   (FR) ...................................... 11 01966

(51) Int. Cl.
| | |
|---|---|
| *H02M 3/335* | (2006.01) |
| *H02J 1/00* | (2006.01) |
| *H02J 9/00* | (2006.01) |

(52) U.S. Cl.
CPC .................. *H02J 1/00* (2013.01); *H02J 9/005* (2013.01); *H02M 3/33507* (2013.01)

(58) Field of Classification Search
CPC ......... H02J 1/00; H02J 9/005; H02M 3/33507
USPC ............ 307/9.1, 10.1, 11; 363/70, 132, 137; 318/139, 798–815, 439, 254, 491, 558
See application file for complete search history.

(56) References Cited

U.S. PATENT DOCUMENTS

| 5,636,109 A | * | 6/1997 | Carroll ........................ 363/21.07 |
|---|---|---|---|
| 5,675,223 A | * | 10/1997 | Yoshizawa et al. .......... 318/139 |
| 7,796,410 B2 | * | 9/2010 | Takayanagi et al. ........... 363/37 |
| 2003/0214826 A1 | * | 11/2003 | Zhu et al. ..................... 363/132 |

(Continued)

FOREIGN PATENT DOCUMENTS

| EP | 1217718 A1 | 6/2002 |
|---|---|---|
| EP | 2164162 A1 | 3/2010 |

(Continued)

OTHER PUBLICATIONS

French Search Report issued in the corresponding French application No. 1101966, mailing date Feb. 16, 2012 (1 page).

(Continued)

*Primary Examiner* — Jared Fureman
*Assistant Examiner* — Aqeel Bukhari
(74) *Attorney, Agent, or Firm* — Osha Liang LLP

(57) ABSTRACT

This printed circuit board (12) comprising:
- a first portion (20) having first electronic components (22) of which the earth electrode is on a first voltage source (14);
- a second portion (24) having second electronic components (26) of which the earth electrode is on a second voltage source (16);
- a third portion (28) inserted between the first portion (20) and the second portion (24);
- a switched-mode power supply circuit (32) connecting the first portion (20) and the second portion (24);
- the said second portion (24) also comprising an electronic component (30) powered by the said first voltage source (14), is characterized in that it also comprises detection means (34) for detecting a drop in electrical consumption of the component (30) and switching means for switching the switched-mode power supply circuit (32) when a predetermined drop in electrical consumption of the said component (30) is detected.

10 Claims, 4 Drawing Sheets

(56) References Cited

U.S. PATENT DOCUMENTS

| | | | |
|---|---|---|---|
| 2004/0184289 A1* | 9/2004 | Vinciarelli | 363/15 |
| 2004/0196669 A1* | 10/2004 | Thrap | 363/19 |
| 2005/0168189 A1* | 8/2005 | Schweigert | 320/107 |
| 2006/0164028 A1* | 7/2006 | Welchko et al. | 318/105 |
| 2007/0051712 A1* | 3/2007 | Kooken et al. | 219/130.1 |
| 2008/0205089 A1* | 8/2008 | Zhu et al. | 363/17 |
| 2008/0316774 A1* | 12/2008 | Ito et al. | 363/17 |
| 2010/0008109 A1 | 1/2010 | Morota | |
| 2010/0133912 A1* | 6/2010 | King et al. | 307/82 |
| 2010/0244782 A1* | 9/2010 | Nagayama et al. | 320/162 |
| 2010/0315024 A1* | 12/2010 | Najima et al. | 318/139 |
| 2011/0012554 A1 | 1/2011 | Lin et al. | |
| 2011/0025124 A1* | 2/2011 | Brabec | 307/9.1 |
| 2011/0095659 A1* | 4/2011 | Hattori et al. | 310/68 D |
| 2011/0181236 A1* | 7/2011 | Yang et al. | 320/107 |
| 2011/0227537 A1* | 9/2011 | Maleus | 320/116 |

FOREIGN PATENT DOCUMENTS

| | | | |
|---|---|---|---|
| JP | 2004-516790 A | 6/2004 |
| JP | 2004-328837 A | 11/2004 |
| JP | 2008-312342 A | 12/2008 |
| JP | 2010-022121 A | 1/2010 |

OTHER PUBLICATIONS

Notice of Reasons for Rejection issued in corresponding Japanese Application No. 2012-140434, mailed on Apr. 19, 2016 (8 pages).

\* cited by examiner

PRINTED CIRCUIT BOARD FOR COMPRESSOR HOUSING

The present invention relates to a printed circuit board, notably for a compressor housing.

The invention relates more particularly to the field of compressors driven electrically, used notably in the air conditioning systems of motor vehicles.

Such a compressor is controlled with the aid of a microprocessor incorporated into a printed circuit board placed on a housing of the compressor.

This printed circuit board usually comprises three portions:
- a first portion having first electronic components of which the earth electrode is on a first voltage source;
- a second portion having second electronic components of which the earth electrode is on a second voltage source; and
- a third portion inserted between the first and second portions and forming a potential barrier.

On this board, the microprocessor is incorporated into the second portion while being powered by the first voltage source via a switched-mode power supply circuit connecting the first portion and the second portion.

In order to save electrical power, when the compressor is stopped, it is necessary to switch the switched-mode power supply circuit.

The instruction to switch the switched-mode power supply circuit is given by the microprocessor by sending a signal through the potential barrier by means of an isolation component. Usually, the isolation component used is an optocoupler.

However, the use of an optocoupler has several drawbacks.

Specifically, the use of an optocoupler in a motor vehicle application is not easy because of problems of reliability of this component which is not qualified for the motor vehicle sector. Moreover, the addition of components involves additional volume and weight.

Furthermore, optocouplers are costly and have a limited service life.

The invention proposes to improve the situation.

The object of the present invention is therefore to avoid the use of an isolation component.

The invention first of all involves a printed circuit board comprising:
- a first portion having first electronic components of which the earth electrode is on a first voltage source;
- a second portion having second electronic components of which the earth electrode is on a second voltage source;
- a third portion inserted between the first portion and the second portion and forming a potential barrier;
- a switched-mode power supply circuit connecting the first portion and the second portion;
- the said second portion also comprising at least one electronic component powered by the said first voltage source via the switched-mode power supply circuit, characterized in that it also comprises detection means for detecting a drop in electrical consumption of the component and switching means for switching the switched-mode power supply circuit when a predetermined drop in electrical consumption of the said component is detected.

For example, the first voltage source delivers a lower voltage than that of the second voltage. In a particular example, the first voltage source is a low voltage and the second voltage source is a high voltage. Notably, in the context of the present application, a low voltage means a voltage below 60 V and a high voltage means a voltage above 60 V.

Therefore, the present invention makes it possible to transfer the instruction to switch the switched-mode power supply circuit from the second portion to the first portion without passing through an isolation component, by using detection of the drop in electrical consumption.

Advantageously, the switched-mode power supply circuit comprises a transformer having a primary and at least one secondary, the primary being connected to the first portion and the secondary being connected to the second portion.

The transformer comprises a galvanic isolation element between its input (primary of the transformer) and its output or outputs (secondaries of the transformer).

Preferably, the detection means are capable of detecting a drop in electrical current flowing in the primary of the transformer below a predetermined current threshold as a function of the predetermined drop in electrical consumption of the said component.

The current threshold is notably a function of the consumption at rest of the component powered at low voltage.

Preferably, the detection means comprise a comparator. This comparator compares the current flowing in the primary with the current threshold. This comparison uses notably an image voltage of this current flowing in the primary.

Advantageously, the electronic component is a microprocessor controlling the power supply of a device via at least one component amongst the second components.

According to a preferred embodiment, the device is a motor of a compressor.

Advantageously, the predetermined drop corresponds to an idling of the component.

Preferably, the board comprises means for inhibiting the switching means when the board is switched on.

The invention also relates to a method for controlling a printed circuit board, the said board comprising:
- a first portion having first electronic components of which the earth electrode is on a first voltage source;
- a second portion having second electronic components of which the earth electrode is on a second voltage source;
- a third portion inserted between the first portion and the second portion and forming a potential barrier;
- a switched-mode power supply circuit connecting the first portion and the second portion;

the said second portion also comprising at least one electronic component powered by the said first voltage source via the switched-mode power supply circuit, the said method comprising the steps of:
- detection of a drop in electrical consumption of the component; and
- switching of the power supply when a predetermined drop in electrical consumption of the said component is detected.

Advantageously, the predetermined drop corresponds to an idling of the component and the method also comprises, before the switching step, the steps of:
- reception by the component of an instruction to switch the power supply; and
- idling of the component.

The invention also relates to a compressor housing comprising a printed circuit board according to the invention.

Other features, details and advantages of the invention will emerge more clearly on reading the description given below as an indication with reference to the drawings in which.

Figure 1:
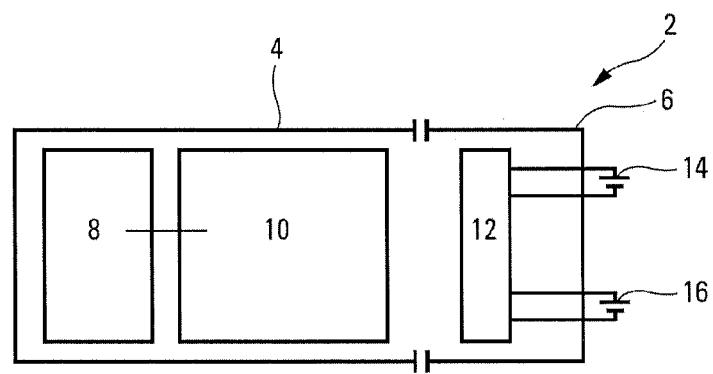
FIG. 1 is a diagram illustrating the structure of a compressor for a motor vehicle.

FIG. 1 illustrates a compressor 2 of an air conditioning device for a motor vehicle in which the present invention can be applied. The compressor 2 comprises a first housing 4 and a second housing 6.

The first housing 4 comprises a compression mechanism 8 with electrical drive.

The first housing 4 also comprises an electric motor 10 for driving the compression mechanism 8.

The second housing 6, usually made of aluminium, comprises a printed circuit board 12 called a PCB for controlling the compression mechanism 8. This PCB notably forms an inverter which powers and controls the electric motor 10.

The PCB 12 is capable of being powered at low voltage and at high voltage by a low-voltage power supply 14 and a high-voltage power supply 16 respectively.

A low voltage means a voltage lower than 60 V, typically equal to 12 V, and a high voltage means a voltage higher than 60 V, typically equal to 305 V. The low voltage corresponds to the voltage available on a protected network of the vehicle while the high voltage originates from an electrical source that also powers an electric motor responsible for driving the movement of the vehicle.

Figure 2:
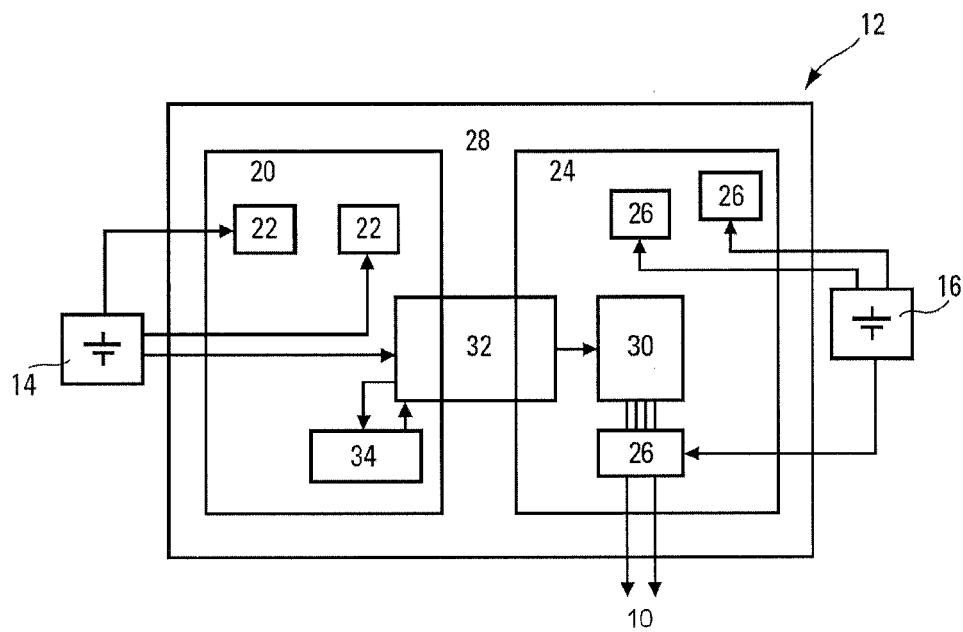
FIG. 2 is a diagram illustrating the detailed structure of a printed circuit board of the compressor of FIG. 1, according to one embodiment of the invention.

FIG. 2 illustrates the detailed structure of the board 12 according to a preferred embodiment of the invention.

The board 12 comprises three distinct portions. The first portion 20 of the board 12 supports first electronic components 22 capable of being powered at low voltage by the low-voltage power supply 14.

The second portion 24 of the board 12 supports second electronic components 26 capable of being powered at high voltage by the high-voltage power supply 16.

The third portion 28 is inserted between the first portion 20 and the second portion 24. It forms a potential barrier between the two portions 20, 24. This third portion 28 possesses no electrical tracks and preferably has a minimum width of 4.5 mm.

The second portion 24 also comprises a microprocessor 30 powered at low voltage by the power supply 14 via a switched-mode power supply circuit 32.

In one variant, the microprocessor 30 is replaced by one or more electronic components powered at low voltage by the power supply 14.

The microprocessor 30 is capable of controlling the power supply of the motor 10 of the compressor 2 via a second component 26 powered at high voltage, such as, for example, a power board connected to the motor 10 of the compressor 2.

The switched-mode power supply circuit 32 is placed so as to straddle between the three portions 20, 28, 24 of the board 12. It is connected as an input to the low-voltage power supply 14 and as an output to the microprocessor 30.

The first portion 20 also comprises means 34 for detecting a drop in electrical consumption of the microprocessor 30 in order to switch the switched-mode power supply circuit 32 when a predetermined drop in electrical consumption of the microprocessor 30 is detected.

Figure 3:
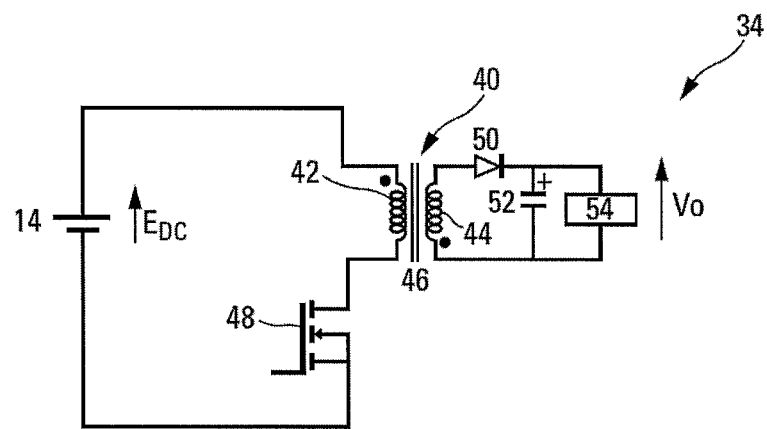
FIG. 3 is a diagram illustrating the structure of an example of a switched-mode power supply circuit of the board according to one embodiment of the invention.

FIG. 3 illustrates the structure of the switched-mode power supply circuit 32 according to a preferred embodiment of the invention.

According to this preferred embodiment, the switched-mode power supply circuit 32 is a Flyback converter. The Flyback converter comprises a transformer 40 comprising a first inductor 42 and a second inductor 44 that are coupled together.

The first inductor 42, with a value L1 and having a number of turns equal to N1, forms the primary of the transformer 40. It is connected to the first portion 20 of the board 12.

The second inductor 44, with a value L2 and having a number of turns equal to N2, forms the secondary of the transformer 40. It is connected to the second portion 24 of the board 12.

A galvanic isolation element 46 separates the primary 42 and the secondary 44.

The primary 42 is powered by the low-voltage power supply 14 via a switch 48 comprising an MOSFET transistor, for example.

The secondary 44 is connected to a diode 50, itself connected to a capacitor 52 connected in parallel to a load 54 comprising notably the microprocessor 30.

Figure 4:
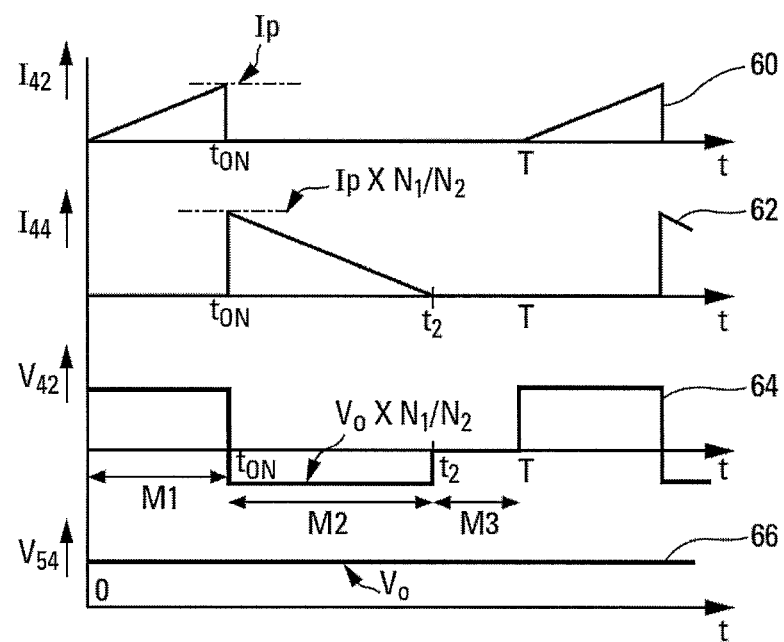
FIG. 4 is a graphic illustrating the operation of a switched-mode power supply circuit.

The operation of the switched-mode power supply circuit 32 is detailed with reference to the curves 60, 62, 64, 66 of FIG. 4 which illustrate respectively the evolution of the primary current $I_{42}$, of the secondary current $I_{44}$, of the primary voltage $V_{42}$ and of the load voltage $V_{54}$ as a function of time.

The switched-mode power supply circuit 32 operates, over a switching period T, according to a duty cycle equal to $\alpha = t_{ON}/T$, $t_{ON}$ representing the period during which the switch 48 conducts. The load voltage $V_{54}$ is constant and equal to $$V_0 = \frac{N2}{N1} \frac{\alpha}{1-\alpha} E_{DC},$$

where $E_{DC}$ is the voltage delivered by the low-voltage power supply 14, $\alpha$ is the duty cycle of the power supply circuit, N1 is the number of turns of the primary 42 and N2 is the number of turns of the secondary 44.

In the on state, for the time t between 0 and $t_{ON}$, the switch 48 is closed. The primary 42 of the transformer 40 is directly connected to the power supply 14 so that the voltage $V_{42}$ of the primary is equal to the voltage $E_{DC}$ generated by the power supply 14. The result of this is an increase in the magnetic flux in the transformer 40. The current $I_{42}$ of the primary 42 then increases according to the relation $$I_{42} = \frac{E_{DC}}{L1} t,$$

where t represents the time, $E_{DC}$ is the voltage delivered by the low-voltage power supply 14 and L1 is the value of the inductor of the primary 42.

At the end of the on state, $I_{42}$ reaches its maximum value $$I_P = \frac{E_{DC}}{L1} t_{ON},$$

where $t_{ON}$ represents the time during which the switch 48 conducts, $E_{DC}$ is the voltage delivered by the low-voltage power supply 14 and L1 is the value of the inductor of the primary 42.

Moreover, $I_P$ is a function of the power P of the components connected to the secondary 44 according to the relation $$I_P = \sqrt{\frac{2*P}{L1*F_d}}$$

where $F_d$ is the switching frequency of the converter. It is therefore possible to determine the time $t_{ON}$ from the power P.

According to one embodiment not shown, the transformer comprises two secondaries. The power P is obtained, according to this example, by virtue of a secondary connected to the earth of the first portion coupled with the secondary connected to the earth of the second portion and powering the microprocessor.

Returning to FIG. 3, in the on state, the voltage at the terminals of the secondary 44 is negative, thus blocking the diode 50 so that the current of the secondary $I_{44}$ is zero. It is the capacitor 52 that supplies the energy demanded by the load 54.

At the end of the on state, at the time $t_{ON}$, the switch 48 opens thus preventing the current of the primary $I_{42}$ from continuing to flow. The conservation of the energy stored in the transformer 40 causes the appearance of a current $I_{44}$ in the secondary of the transformer 40 the initial value of which is equal to $$I_P \times \frac{N1}{N2}.$$

The current $I_{44}$ is given by the relation $$I_{44} = I_P \times \frac{N1}{N2} - \frac{V_0}{L_2}(t - t_{ON}) \cdot I_{44}$$

cancels out at $t=t_2$.

The voltage of the primary $V_{42}$, between $t_{ON}$ and $t_2$, is given by the relation $$V_{42} = -\frac{N1}{N2} V_0.$$

It is zero between $t_2$ and T.

Therefore, for a period, the switched-mode power supply circuit operates in three distinct modes: a first mode M1 for the time between 0 and $t_{ON}$, a second mode M2 for the time between $t_{ON}$ and $t_2$ and a third mode M3 for the time between $t_2$ and T.

Figure 5:
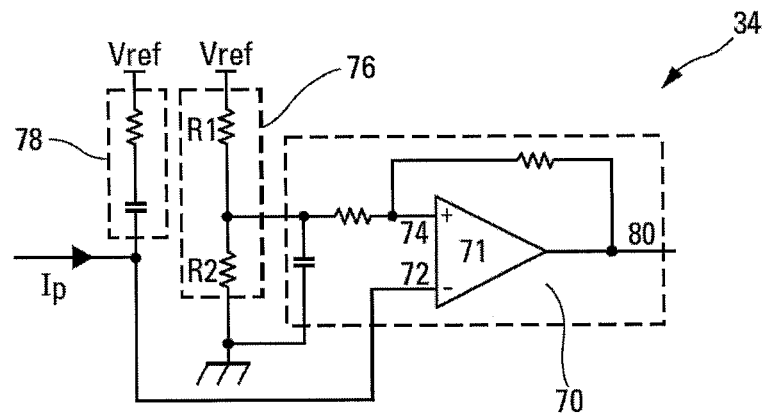
FIG. 5 is a diagram illustrating the structure of an example of detection means of the board according to one embodiment of the invention.

FIG. 5 details the structure of the detection means 34 for detecting a drop in consumption of the microprocessor 30. This drop in consumption results in a drop in the electrical power at the secondary 44 involving a drop in the maximum current $I_P$ of the primary 42.

The detection means 34 comprise a comparator 70 preferably with hysteresis.

The comparator 70 comprises an error amplifier 71 receiving, on an inverter input 72, a signal representing the maximum current $I_P$ of the primary and, on a non-inverter input 74, a signal representing a predetermined current threshold $I_S$. This threshold is fixed by means of a circuit 76 comprising two resistors R1 and R2 in series. The threshold $I_S$ is chosen so as to correspond to a predetermined drop in electrical consumption of the microprocessor 30. For example, the predetermined drop in electrical consumption corresponds to an idling of the microprocessor 30.

The detection means 34 also comprise means 78 for inhibiting the comparator 70 during the start-up phase. These inhibition means 78 preferably comprise an RC circuit for raising the potential of the non-inverter input 74 of the error amplifier 71 in order to always impose a low state at the output 80 of the comparator 70 throughout the whole start-up phase. Thus, there is no risk of switching the power supply 14 during the start-up phase.

Figure 6:
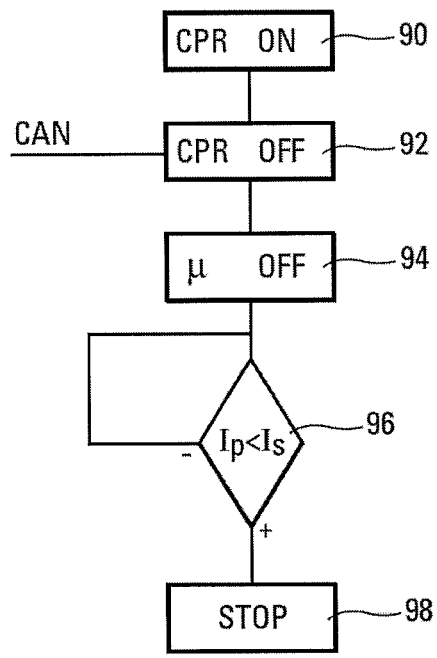
FIG. 6 is a flowchart illustrating the operating of the control method according to the invention.
Figure 7:
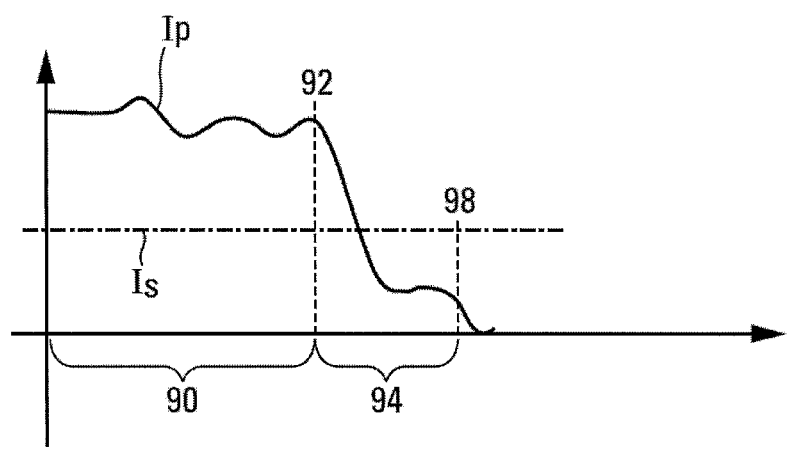
FIG. 7 is a graphic illustrating an example of application of the method according to the invention.

The flowchart of FIG. 6 and the graphic of FIG. 7 detail the operation of the method for controlling the power supply.

During a step 90, the compressor 2 is operating.

At step 92, the microprocessor 30 receives, for example from a CAN bus of the vehicle, an instruction to stop the power supply of the compressor 2. It then instructs the stopping of the compressor 2 and enters, during the step 94, idling mode.

This causes a drop in the electrical consumption of the microprocessor 30 which results in a drop in power at the secondary 44 of the transformer and therefore a drop in the peak-to-peak current $I_P$ of the primary 42.

At step 96, the detection means 34 compare the current $I_P$ with the threshold $I_S$. When the value of the current $I_P$ falls below $I_S$, the low-voltage power supply 14 is switched at step 98.

Naturally, other embodiments may be envisaged.

The board according to the invention has been described in an example in which the switched-mode power supply is a Flyback converter. However, the board according to the invention may comprise another type of switched-mode power supply.

The invention claimed is:

1. A printed circuit board comprising:
   a first portion having first electronic components of which an earth electrode is on a first voltage source;
   a second portion having second electronic components of which a second earth electrode is on a second voltage source
   a third portion located between the first portion and the second portion;
   a switched-mode power supply circuit connecting the first portion and the second portion;
   the second portion also comprising a microprocessor powered by the said first voltage source via the switched-mode power supply circuit;
   a comparator for detecting a drop in electrical consumption of the microprocessor; and
   a switch for switching the switched-mode power supply circuit when a predetermined drop in electrical consumption of the microprocessor is detected, and wherein the third portion prevents direct contact between the first electronic components disposed in the first portion and the second electronic components disposed in the second portion.

2. The board according to claim 1, in which the switched-mode power supply circuit comprises a transformer having a primary and at least one secondary, the primary being connected to the first portion and the secondary being connected to the second portion.

3. The board according to claim 2, in which the a comparator is further configured to detect a drop of an electrical current flowing in the primary of the transformer below a predetermined current threshold as a function of the predetermined drop in electrical consumption of the microprocessor.

4. The board according to claim 1, in which the microprocessor controls the power supply of a device via at least one component amongst the second electronic components.

5. The board according to claim 4, in which the device is a motor of a compressor.

6. The board according to claim 1, in which the predetermined drop corresponds to an idling of the microprocessor.

7. The board according to claim 1, further comprising an RC circuit for inhibiting the a switch when the board is switched on.

8. A method for controlling a printed circuit board, the board comprising:
   a first portion having first electronic components of which an earth electrode is on a first voltage source;
   a second portion having second electronic components of which the earth electrode is on a second voltage source;
   a third portion located between the first portion and the second portion;
   a switched-mode power supply circuit connecting the first portion and the second portion;
   the second portion also comprising a microprocessor powered by the first voltage source via the switched-mode power supply circuit,
   the method comprising the steps of:
      detection of a drop in electrical consumption of the microprocessor; and
      switching of the power supply when a predetermined drop in electrical consumption of the microprocessor is detected, and
   wherein the third portion prevents direct contact between the first electronic components disposed in the first portion and the second electronic components disposed in the second portion.

9. The method according to claim 8, in which the predetermined drop corresponds to an idling of the microprocessor, and wherein the method further comprises, before the switching step:
   reception by the microprocessor of an instruction to switch the power supply; and
   idling of the microprocessor.

10. A compressor housing comprising a printed circuit board according to claim 1.

* * * * *